United States Patent
Misso et al.

(10) Patent No.: US 6,288,878 B1
(45) Date of Patent: Sep. 11, 2001

(54) TOLERANCE RING WITH HIGH HOOP STRENGTH TO RESIST DEFORMATION

(75) Inventors: Nigel F. Misso, Bethany; Denis A. Seewald, Mustang; Inman L. Jones; Dana P. Eddings, both of Yukon, all of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/687,015

(22) Filed: Oct. 13, 2000

Related U.S. Application Data (60) Provisional application No. 60/181,173, filed on Feb. 9, 2000.

(51) Int. Cl.[7] ............................. G11B 5/55; B25G 3/20; F16C 27/00
(52) U.S. Cl. .................................. 360/264.3; 360/265.2; 403/372; 384/535
(58) Field of Search ..................... 403/365, 371, 403/372; 360/264.3, 265.2, 265.6; 384/535, 581

(56) References Cited

U.S. PATENT DOCUMENTS

| | | | |
|---|---|---|---|
| 3,700,271 | * 10/1972 | Blaurock et al. | 403/372 |
| 3,776,653 | * 12/1973 | Buzogany | 403/372 |
| 5,539,597 | * 7/1996 | Blanks | 360/98.06 |
| 5,548,458 | * 8/1996 | Pelstring et al. | 360/99.08 |
| 5,983,485 | * 11/1999 | Misso | 29/603.03 |
| 6,163,441 | * 12/2000 | Wood et al. | 360/266.1 |

\* cited by examiner

*Primary Examiner*—David Davis
(74) *Attorney, Agent, or Firm*—Crowe & Dunlevy (57) ABSTRACT

A tolerance ring is disclosed which provides increased hoop strength and resistance to deformation. The tolerance ring is placed on a stationary post so as to circumferentially extend about an outer surface of the post. An actuator assembly with an inner bored recess is thereafter placed onto the post so that the tolerance ring is compressed between the surface of the inner bored recess and the outer surface of the post, thereby maintaining a desired nominal position of the actuator assembly about the actuator pivot axis. The mechanical configuration of the tolerance ring includes a substantially cylindrical base portion from which at least one brace portion and a plurality of contact portions project. The brace portion preferably extends along the circumference of the base portion and preferably comprises either a circumferentially extending ridge or flange.

10 Claims, 6 Drawing Sheets

TOLERANCE RING WITH HIGH HOOP STRENGTH TO RESIST DEFORMATION

RELATED APPLICATIONS

This application claims the benefit of U.S. Provisional Application No. 60/181,173, filed Feb. 9, 2000.

FIELD OF THE INVENTION

This invention relates generally to the field of disc drive storage devices, and more particularly, but not by way of limitation, to a tolerance ring with increased hoop strength and resistance to deformation.

BACKGROUND OF THE INVENTION

Modern hard disc drives comprise a mechanical housing which encloses one or more rigid discs that are rotated at a constant high speed. Data are stored on the discs in a plurality of concentric circular tracks by an array of transducers ("head") mounted to a radial actuator for movement of the heads relative to the discs.

The heads are mounted via flexures at the end of a plurality of arms that project radially outward from an actuator body. The actuator body pivots about a pivot shaft, such as a vertical post which extends upwardly from the housing. The post is parallel with the axis of rotation of the discs so that the heads move in a plane parallel with the surface of the discs.

Typically, such radial actuators employ a voice coil motor to position the heads with respect to the disc surfaces. The voice coil motor includes a magnetic circuit mounted to the disc drive housing and a coil mounted on the side of the actuator body opposite the head arms so as to be immersed in the magnetic field of the magnetic circuit. When controlled current is passed through the coil, an electromagnetic field is set up which interacts with the magnetic field of the magnetic circuit to cause the coil to move in accordance with the well-known Lorentz relationship. As the coil moves, the actuator body pivots about the post and the heads move across the disc surfaces.

In the manufacturing of a disc drive, it is important that the actuator assembly be placed in the proper location, centered on all three axes, longitudinal, latitudinal, and translational (x, y, and z) with respect to the discs. Typically, the actuator assembly has a large bored recess which accommodates a cartridge bearing assembly with a pair of ball bearing assemblies to accommodate rotation of the actuator assembly about the z-axis. The cartridge bearing assembly includes an inner bored recess to allow the actuator assembly to fit over the pivot post. The diameters of the large bored recess and the inner recess are maintained within predetermined, close tolerance ranges.

A tolerance ring can be advantageously used to compensate for variances of the part manufacturing tolerances and thus retain the proper positioning of the actuator assembly in all three axes. Typically, prior art tolerance rings consist of a corrugated sheet of metal formed into an open cylindrical shape. The tolerance ring is then provisioned around the post and stationarily held in position by an anchoring groove in the pivot post. In most applications, the tolerance ring serves only as a manufacturing aid and provides no additional function after completed manufacture. Exemplary prior art tolerance ring configurations are disclosed in U.S. Pat. No. 5,315,465 issued to Blanks, U.S. Pat. No. 4,286,894 issued to Rongley, and U.S. Pat. No. 3,838,928 issued to Blaurock et al.

Although widely used, most prior art tolerance rings fail to exhibit adequate hoop strength. Hoop strength is a measure of the grasping force that a tolerance ring is capable of exerting when engaged with the pivot post. Significantly, inadequate hoop strength may cause an impermissible degree of movement between the tolerance ring and the pivot post. Consequent placement of the actuator assembly over an improperly positioned tolerance ring may cause the tolerance ring to foul or be forced out of the anchoring groove.

Additionally, a tolerance ring with insufficient hoop strength is susceptible to deformation during shipping and handling. Frequently as a result of mishandling the tolerance ring experiences a helical deformation in which the tolerance ring "twists" about a central axis, thereby rendering the tolerance ring useless for subsequent manufacturing purposes. The likelihood of deformation during shipping and handling reduces the efficiency of the manufacturing process by necessitating the inspection of the parts before introduction into automated assembly.

With an increasing demand for improved consistency in the installation of actuator assemblies, there remains a continuing need for the development of a tolerance ring which is resistant to deformation and which exhibits increased hoop strength. It is to such improvements that the present invention is directed.

SUMMARY OF THE INVENTION

The present invention is directed to a tolerance ring that provides increased hoop strength and resistance to deformation.

As exemplified by preferred embodiments, a disc drive includes a basedeck which supports an upwardly extending shaft, such as a post, which defines an actuator pivot axis. A tolerance ring constructed in accordance with preferred embodiments of the present invention is placed on the post so as to circumferentially extend about an outer surface of the post. An actuator assembly with an inner bored recess is thereafter placed onto the post so that the tolerance ring is compressed between the surface of the inner bored recess and the outer surface of the post, thereby maintaining a desired nominal centering of the actuator assembly about the actuator pivot axis.

The mechanical configuration of the tolerance ring is selected to provide increased hoop strength and includes a substantially cylindrical base portion from which at least one brace portion and a plurality of contact portions project. The brace portion preferably extends along the circumference of the base portion and preferably comprises either a circumferentially extending ridge or flange.

Various other advantages and features of the present invention will be apparent from the following detailed description when read in conjunction with the drawings and appended claims.

DETAILED DESCRIPTION

Figure 1:
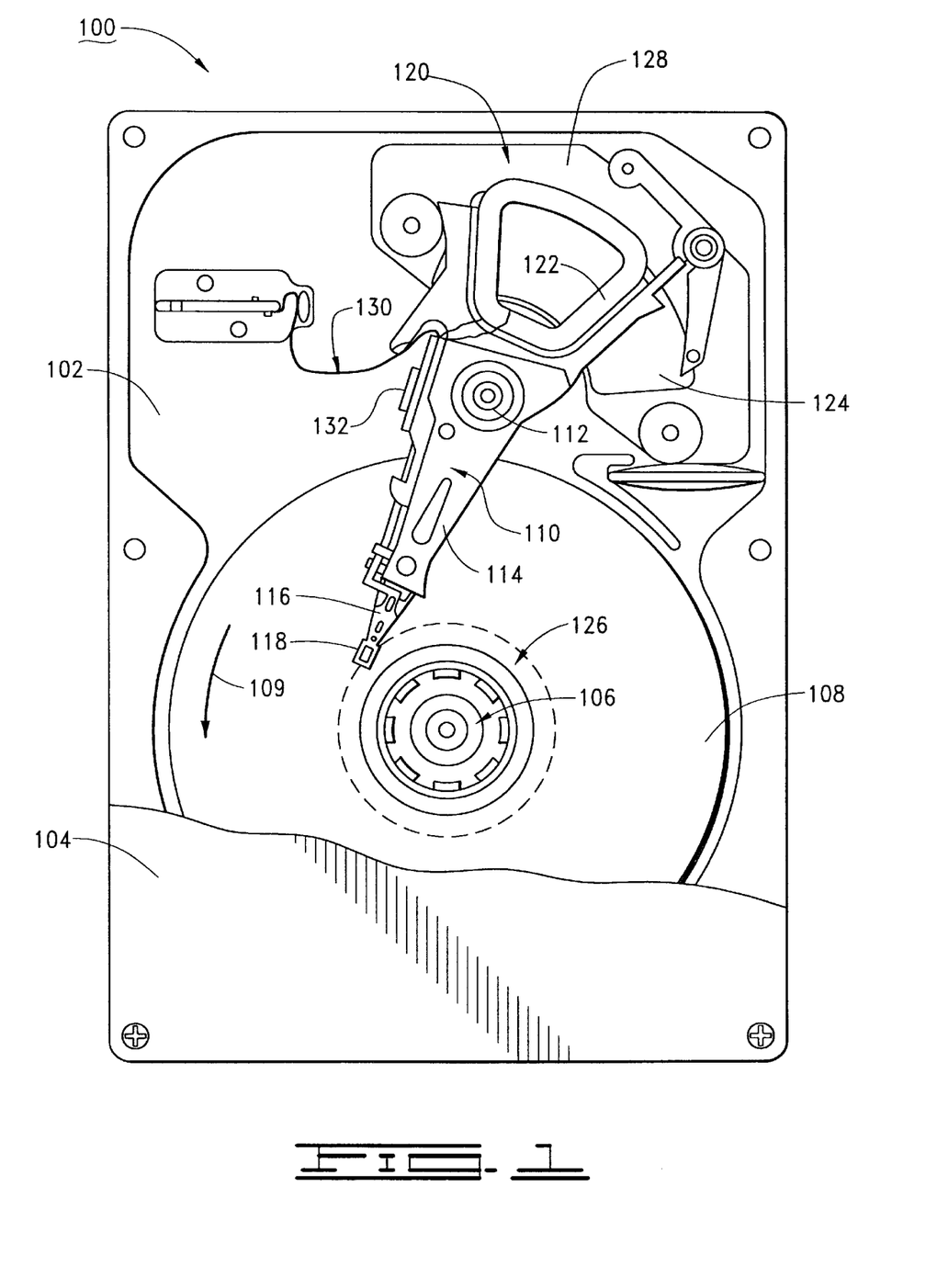
FIG. 1 is a top plan view of a disc drive incorporating a tolerance ring constructed in accordance with preferred embodiments of the present invention.

In order to provide a detailed description of various preferred embodiments of the present invention, reference is first made to FIG. 1, which provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor (shown generally at 106) is provided to rotate a plurality of axially-aligned, rigid, magnetic recording discs 108 at a constant velocity (in thousands of revolutions per minute) as indicated by vector 109. User data are written to and read from tracks (not designated) on the discs 108 through the use of an actuator assembly 110, which rotates about a bearing shaft assembly 112 positioned adjacent the discs 108. As discussed below, a tolerance ring constructed in accordance with preferred embodiments of the present invention is advantageously used to locate the actuator assembly 110 with respect to the basedeck 102.

The actuator assembly 110 includes a plurality of rigid actuator arms 114 which extend toward the discs 108. A plurality of flexible suspension assemblies 116 are attached to the distal end of the actuator arms 114. Mounted at the distal end of each of the flexible suspension assemblies 116 is a head 118 which includes a slider assembly (not separately designated) designed to fly in close proximity to the corresponding surface of the associated disc 108. The heads 118 are preferably characterized as giant magneto-resistive (GMR) heads each having a thin-film inductive write element and a GMR read element.

For reference, it will be understood that the radial position of the heads 118 is controlled through the use of a voice coil motor (VCM) 120, which includes a coil 122 as well as a permanent magnet 124 which establishes a magnetic field in which the coil 122 is immersed. A second magnetic flux path is disposed above the permanent magnet 124, but has not been shown for purposes of clarity. The heads 118 are moved across the surfaces of the discs 108 through the application of current to the coil 122. When the disc drive 100 is not in use, the heads 118 are moved over and come to rest upon landing zones 126 near the inner diameter of the discs 108 and the actuator assembly 110 is secured using a magnetic latch assembly 128. A flex assembly 130 provides the requisite electrical connection paths for the actuator assembly 110 while allowing pivotal movement of the actuator assembly 110 during operation.

Figure 2:
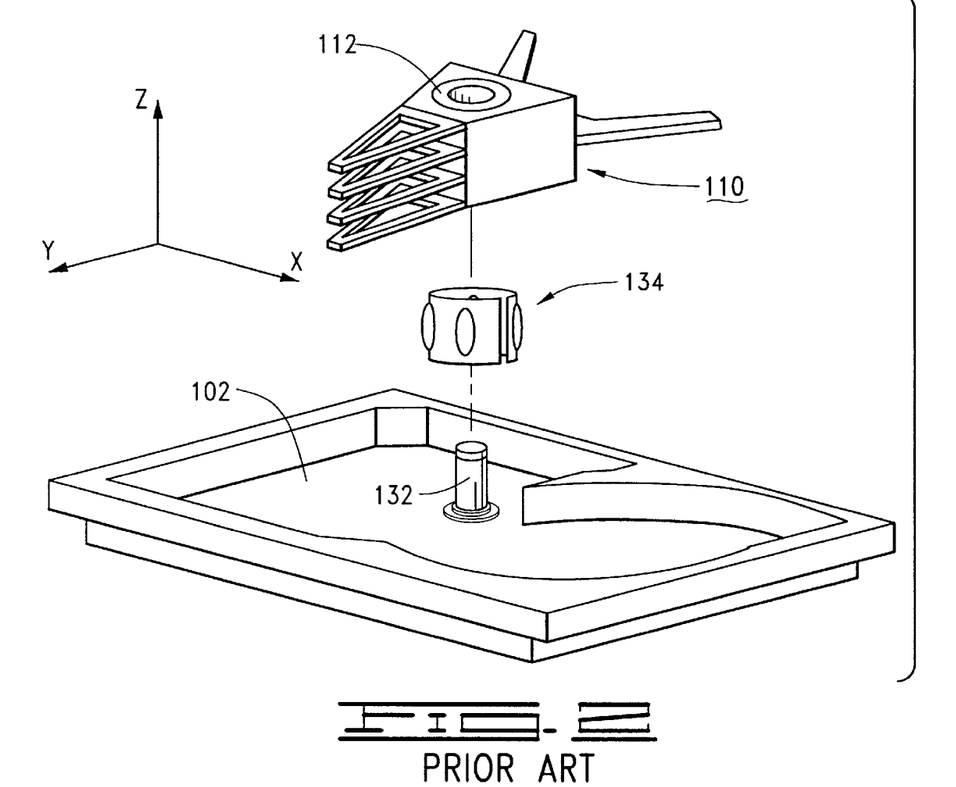
FIG. 2 is an exploded view of a prior art disc drive similar to FIG. 1 to illustrate the manner in which a tolerance ring advantageously facilitates installation of an actuator assembly into a disc drive.
Figure 3:
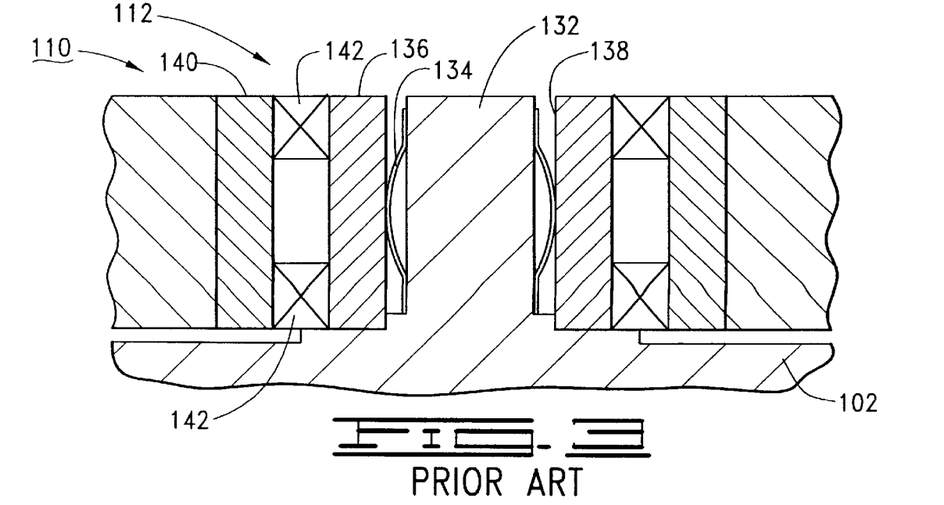
FIG. 3 is a cross-sectional view of the actuator assembly and tolerance ring of FIG. 2 along a selected axis of rotation.

To describe an environment in which preferred embodiments of the present invention can be advantageously employed, FIGS. 2 and 3 illustrate general use of a tolerance ring in the prior art to retain an actuator during assembly of the disc drive. For clarity, reference numerals from FIG. 1 are used in FIGS. 2 and 3 for similar components.

As shown in FIG. 2, a post 132 extends from the basedeck 102 to define an actuator pivot axis (in the z-axis direction) about which the actuator assembly rotates. During assembly, a tolerance ring 134 (also referred to as a "spacer ring" or "axial support") is placed around the outer surface of the post 132 and the actuator assembly 110 is then inserted over the post 132. Compression of the tolerance ring (134 between the post 132 and the cartridge bearing assembly 112 serves to maintain the actuator assembly 110 in a desired relation to the actuator pivot axis during precise manufacturing processes, thereby improving the accuracy of the actuator assembly 110 during subsequent operation.

FIG. 3 provides a cross-sectional view of the actuator assembly 110 after installation onto the post 132. As shown by FIG. 3, the cartridge bearing assembly 112 comprises an inner sleeve 136 (with inner bored recess 138), an outer sleeve 140, and a pair of bearing assemblies 142 disposed therebetween. The tolerance ring 134 pressingly engages the inner bored recess 138 and the outer surface (not designated) of the post 132. While the embodiment of FIG. 3 shows a press-fit between the outer sleeve 140 and the actuator assembly 110, in an alternative embodiment, a second tolerance ring (nominally similar to the tolerance ring 134, but having a corresponding larger circumference) can be provided between the outer sleeve 140 and the actuator assembly 110, as desired.

Figure 4:
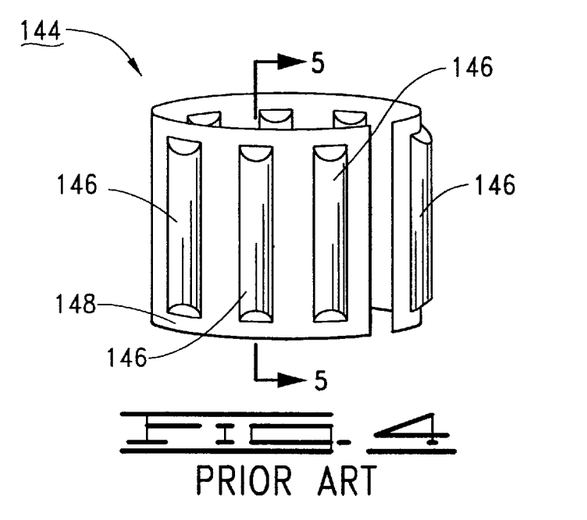
FIG. 4 is an isometric view of a prior art tolerance ring design.

For purposes of illustrating various operational advantages of the tolerance ring of the present invention, FIG. 4 has been provided to show an exemplary tolerance ring 144 formed in accordance with the prior art. As will be noted from FIG. 4, the tolerance ring 144 is formed from a nominally planar piece of material that is curved to be fitted around a post (or other cylindrical member). The tolerance ring 144 includes contact portions 146 (also referred to as "corrugations") which are evenly spaced around and which project from a substantially cylindrical base portion 148. The contact portions 146 are shown in FIG. 4 to project radially outwardly in a direction away from the interior of the tolerance ring 144. However, it will be recognized that alternative configurations known in the art include tolerance rings with raised surfaces that project inwardly, as well as raised surfaces that successively project inwardly and outwardly in an alternating fashion.

Figure 5:
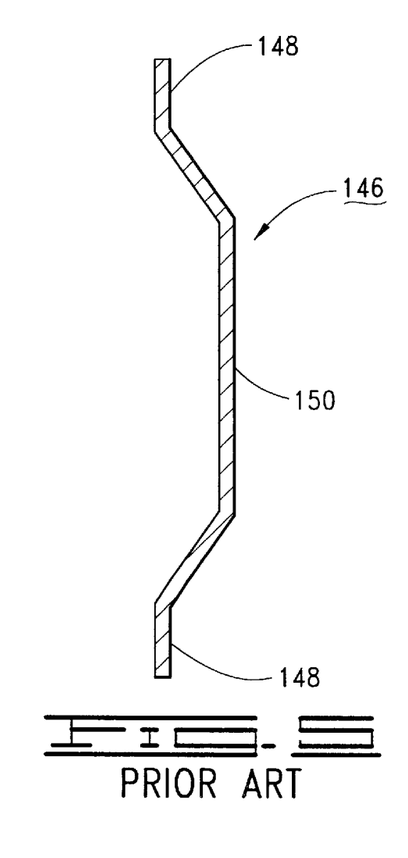
FIG. 5 is a cross-sectional view of the prior art tolerance ring of FIG. 4 along line 5—5 in FIG. 4.

Each contact portion 146 of the prior art tolerance ring 144 has a generally rhomboidal cross-sectional shape extending lengthwise, as shown in FIG. 5 which represents the view along line 5—5 in FIG. 4. More particularly, the contact portion 146 of FIG. 5 includes a contact surface 150 which maintains direct contract with the object fitted around the tolerance ring 144.

Figure 6:
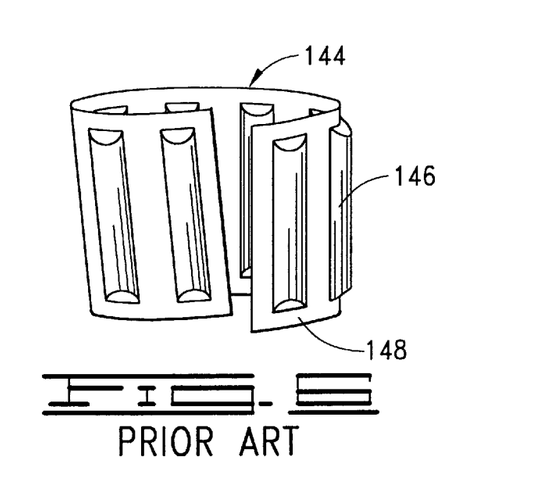
FIG. 6 is an isometric view of a prior art tolerance ring subjected to deformation.

Turning now to FIG. 6, shown therein is the prior art tolerance ring 144 exhibiting deformation from installation or handling. The deformation causes the end portions of the tolerance ring 144 to "twist," thereby creating a slightly spiraled structure. Additional common structural failures include bending (crimping), flexing (stretching) and buckling (not shown in FIG. 6). These and other deformations may occur during shipping and handling of the tolerance ring 144. during installation of the tolerance ring 144 onto the post 132 or during placement of the actuator assembly 110 about the tolerance ring 144. Insufficient hoop strength is a significant cause of structural failures in prior art tolerance rings (such as 144).

Figure 7:
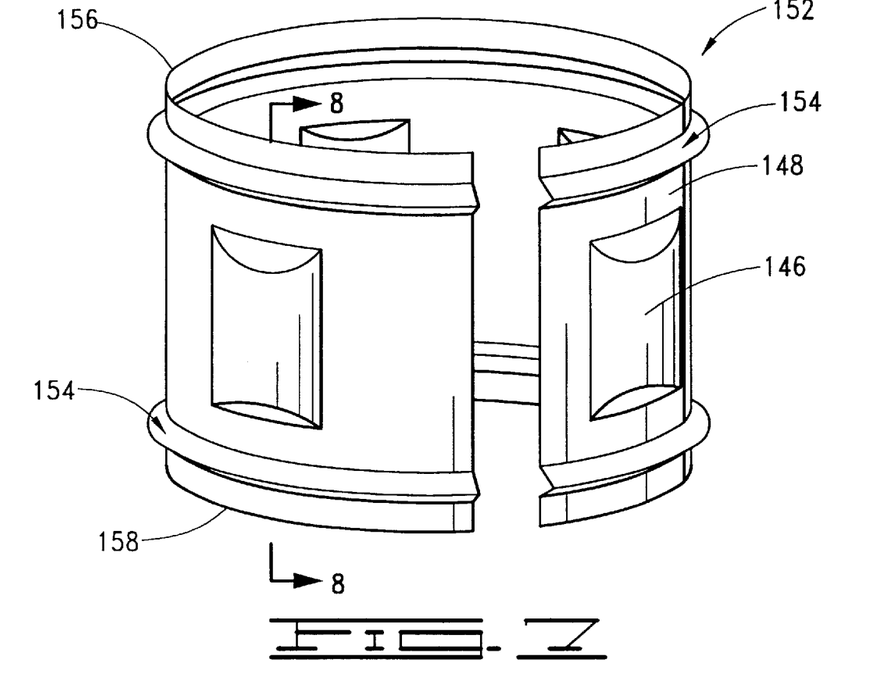
FIG. 7 is an isometric view of a tolerance ring constructed in accordance with a first preferred embodiment of the present invention.

Turning now to FIG. 7, shown therein is a first preferred embodiment of a tolerance ring 152 with increased hoop strength. Like the prior art tolerance ring 144, the tolerance ring 152 is formed from a nominally planar piece of material and includes contact portions 146 which are evenly spaced around, and which project from, a substantially cylindrical base portion 148. Each contact portion 146 includes a contact surface 150 which is used to distribute the force applied by the inner sleeve 136 of the cartridge bearing assembly 112 during installation of the actuator assembly 110. Although four contact portions 146 are depicted in FIG. 7, it will be understood that alternative numbers and configurations of contact portions 146 are encompassed by the present invention.

The tolerance ring 152 also includes two brace portions 154 which extend along the circumference of the tolerance ring 152. In the first preferred embodiment depicted in FIG. 7, the brace portions 154 comprise circumferentially extending ridges and are disposed parallel to, and in close proximity with, the top edge 156 and bottom edge 158 of the tolerance ring 152. Although two brace portions 154 are depicted, it will be understood that fewer or more brace portions 154 could be incorporated by the tolerance ring 152. Additionally, the present invention contemplates forming the brace portion 154 in other than a parallel relation to the top edge 156 or bottom edge 158 of the tolerance ring 152. For example, a single brace portion 154 could spirally extend along the circumference of the tolerance ring 152 from the top edge 156 to the bottom edge 158. Also preferred is forming the brace portions 154 during the same production step and from the same construction material used to articulate the balance of the features on the tolerance ring 152.

Figure 8:
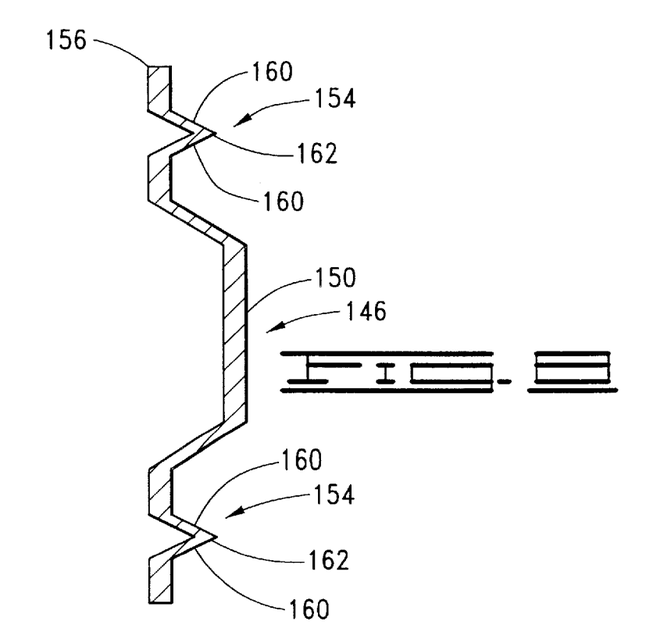
FIG. 8 is a cross-sectional view of the tolerance ring of FIG. 7 along line 8—8 in FIG. 7.

With reference now to FIG. 8, shown therein is a cross-sectional view of the contact portion 146 and brace portions 154 along line 8—8 in FIG. 7. From FIG. 8, it can be seen that each brace portion 154, or ridge, comprises two steeped sides 160 which intersect one another at an apex 162. To avoid interfering with the proper function of the contact portion 146, the apex 162 should not outwardly extend beyond the contact surface 150. That is, the profile of the brace portion 154 should be smaller than the corresponding profile of the contact portion 146.

Figure 9:
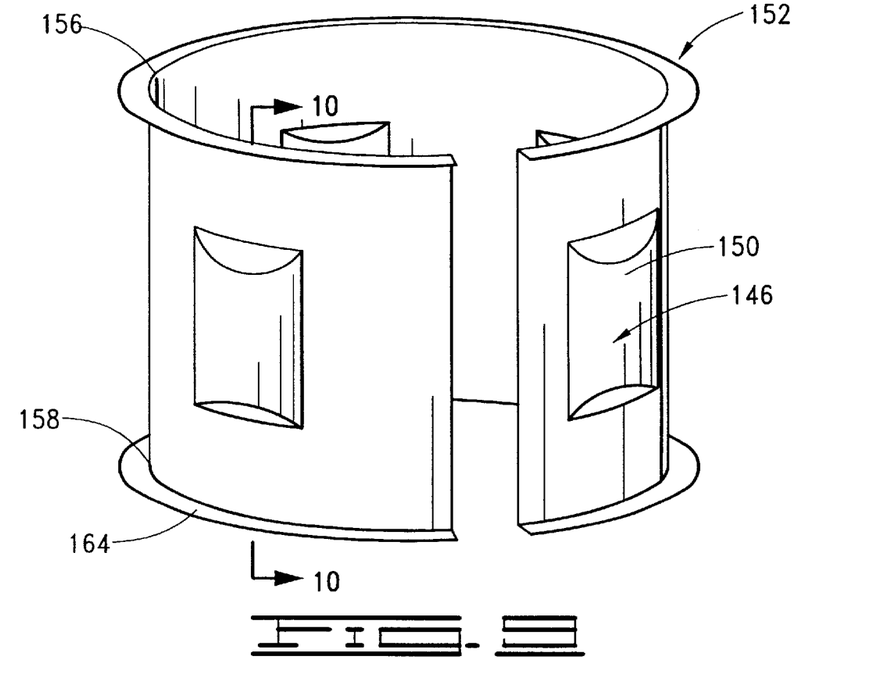
FIG. 9 is an isometric view of a tolerance ring constructed in accordance with a second preferred embodiment of the present invention.

Turning now to FIG. 9, shown therein is an isometric view of a second preferred embodiment of the tolerance ring 152 with an alternate brace portion 164. In the second preferred embodiment, each brace portion 164 comprises a flange, disposed at either the top edge 156 or the bottom edge 158. Of course, although two brace portions 164 are depicted in FIG. 9, it will be understood that use of a single brace portion 164 is also encompassed by the present invention. Preferably, the brace portions 164 are formed during the same production step and from the same construction material used to articulate the balance of the features on the tolerance ring 152.

Figure 10:
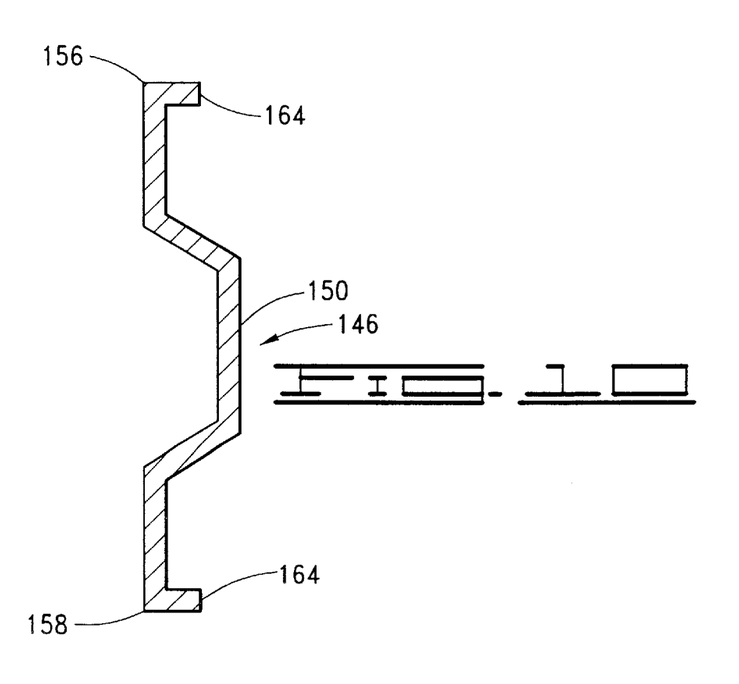
FIG. 10 is a cross-sectional view of the tolerance ring of FIG. 9 along line 10—10 in FIG. 9.

Turning now to FIG. 10, shown therein is a cross-sectional view of the contact portion 146 and alternate brace portions 164, or flanges, along line 10—10 in FIG. 9. To avoid interfering with the proper distribution of contact forces by the contact portion 146, the brace portion 164 should not outwardly extend beyond the contact surface 150. That is, the profile created by the brace portions 164 should be less than the profile created by the contact portions 146.

Figure 11:
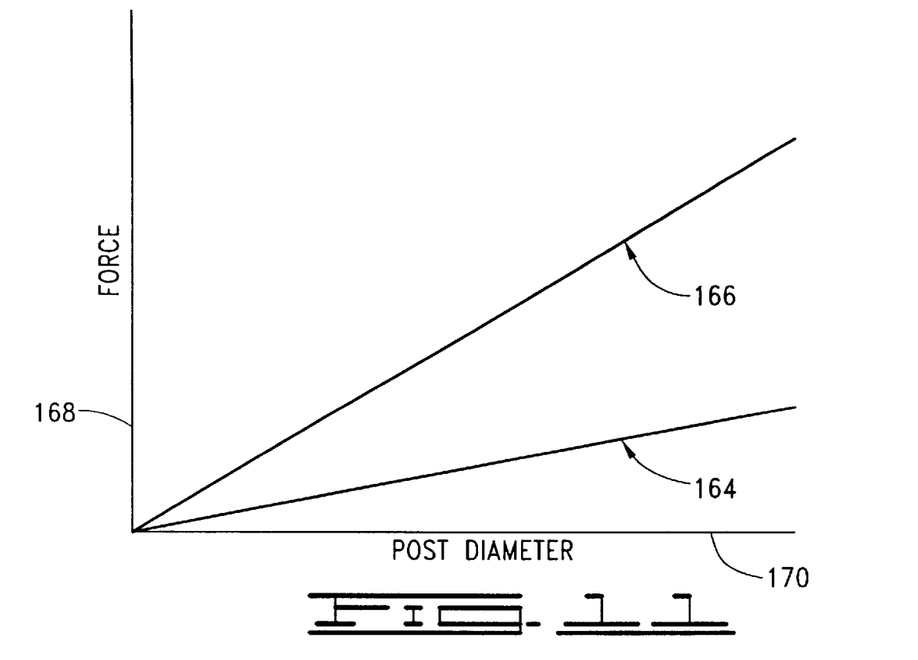
FIG. 11 is a graphical comparison of the hoop strength exhibited by the prior art tolerance ring of FIG. 4 and by the tolerance rings of FIGS. 7 and 9 constructed in accordance with the present invention.

Referring now to FIG. 11, shown therein is a graphical comparison of the hoop strength exhibited by the prior art tolerance ring 144 (represented by curve 164) and by the tolerance ring 152 constructed in accordance with the present invention (represented by curve 166). The curves 164, 166 are plotted against a y-axis 168 representative of the force exerted by the tolerance rings 144, 152 as the diameter of the post 132 increases along the x-axis 170. The relative hoop strengths of the tolerance rings 144, 152 are evaluated by fitting dimensionally similar tolerance rings 144, 152 around a series of posts 132 with incrementally increasing diameters. As the diameter of the post 132 increases, the amount of grasping force exerted by the fitted tolerance rings 144, 152 also increases.

A comparison of curves 166 and 164 reveals that the inventive tolerance ring 152 (constructed with at least one brace portion 154, 164) exhibits a greater hoop strength than the prior art tolerance ring 144. The improved hoop strength is especially important in the lower range of grasping force where too little grasping force results in a tolerance ring that loosely engages the post 132. As mentioned above, a loosely fitting tolerance ring may foul or slip from its intended position during the subsequent installation of the actuator assembly.

Figure 12:
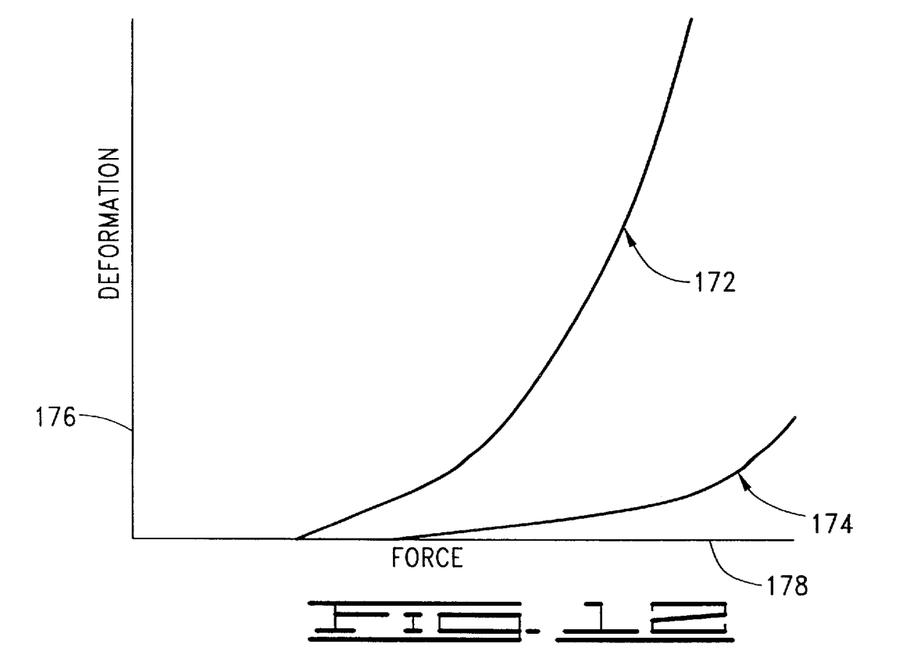
FIG. 12 is a graphical comparison of the resistance to deformation exhiblited by the prior alt tolerance ring of FIG. 4 and by the tolerance rings of FIGS. 7 and 9 constructed in accordance with the present invention.

Turning now to FIG. 12, shown therein is a graphical comparison of deformation resistance exhibited by the prior art tolerance ring 144 (represented bed curve 172) and the tolerance ring 152 constructed in accordance with the present invention (represented by curve 174). The deformation curves 172,174 are plotted against a deformation axis 176 and a force axis 178.

The comparison of curves 172, 174 reveals that the tolerance ring 152 (constructed with at least one brace potion 154,164) exhibits a greater resistance to deformation caused by an externally applied force, Such as, for example, from mishandling or from installation of the actuator assembly 110. Although the inventive tolerance ring 152 does eventually deform (curve 174), it is significant that the initial deformation occurs at greater applied force and is more gradual than the deformation realized by the prior art tolerance ring 144. It will be understood that the scale and deformation characteristics of the respective tolerance rings 144, 152 in FIGS. 11 and 12 have been exaggerated somewhat to more clearly demonstrate the differences therebetween.

In view of the foregoing, it will now be understood that the present invention is directed to a tolerance ring which provides increased hoop strength when fitted about a stationary post. Additionally, the inventive tolerance ring exhibits an increased resistance to deformation in the presence of an applied force.

In accordance with preferred embodiments, a tolerance ring (such is 152) has a substantially cylindrical base portion (such as 148) from which a plurality of spaced apart contact portions (such as 146) radially extend. Each contact portion has a contact surface (such as 150) which distributes the forces exerted during installation of an actuator assembly (such as 110). The tolerance ring 152 also includes a brace portion (such as 154 or 164) that extends along the circumference of the base portion 148. Preferably, the profile of the brace portion 154, 164 is nominally less than the profile of the contact portions 146.

For purposes of the amended claims, the term "means for increasing the hoop strength" will be clearly understood as corresponding to the brace portions 154, 164 of FIGS. 7–10 and will explicitly exclude as nonequivalent structures the prior art structures shown in FIGS. 2–6. The term "hoop strength" will be understood consistent with the foregoing discussion to describe the ability to resist deformation of the tolerance ring in response to handling or installation.

It will be clear that the present invention is well adapted to attain the ends and advantages mentioned as well as those inherit within. While the presently preferred embodiment has been described for purposes of this disclosure, numerous changes may be made which will readily suggest themselves to those skilled in the art and which are encompassed in the spirit of the invention disclosed as well as defined in the appended claims.

What is claimed is:

1. A tolerance ring circumferentially extending about an axis, comprising:
    a substantially cylindrical base portion extending an axial length along the axis and a radial length about the axis;
    a plurality of spaced apart contact portions which project a first radial distance from the base portion, wherein the plurality of contact portions cooperatively act with the base portion to mechanically engage an inner surface of a first member with an outer surface of a second member; and
    a separate brace portion which circumferentially extends about the axis and which projects from the base portion a second radial distance less than the first radial distance to increase hoop strength of the tolerance ring, wherein the brace portion is a circumferentially extending ridge having an apex formed by an intersections of two steeped portions.

2. The tolerance ring of claim 1, wherein the circumferentially extending ridge is disposed at a selected distance above or below the plurality of contact portions.

3. The tolerance ring of claim 1, wherein the tolerance ring comprises stainless steel.

4. The tolerance ring of claim 1, wherein the tolerance ring comprises polymeric material.

5. The tolerance ring of claim 1, wherein the tolerance ring comprises polyphenylsulfone.

6. A disc drive, comprising:
    a basedeck;
    a spindle motor supported on the basedeck;
    a disc supported on the spindle motor for rotation about a disc axis;
    a moveable actuator assembly which pivotally supports a head adjacent the disc, the actuator assembly having a central aperture with an inner surface;
    a stationary shaft supported on the basedeck having an outer surface and which defines an actuator axis nominally parallel to the disc axis; and
    a tolerance ring compressingly disposed between the inner and outer surfaces to mount the actuator assembly for rotation about the shaft, comprising:
        a substantially cylindrical base portion extending an axial length along the actuator axis and a radial length about the actuator axis;
        a plurality of spaced apart contact portions which project a first radial distance from the base portion, wherein the plurality of contact portions cooperatively act with the base portion to mechanically engage the inner and outer surfaces; and
        a separate brace portion which circumferentially extends about the actuator axis and which projects from the base portion a second radial distance less than the first radial distance to increase the hoop strength of the tolerance ring, wherein the brace portion is a circumferentially extending ridge having an apex formed by an intersections of two steeped portions.

7. The disc drive of claim 6, wherein the circumferentially extending ridge is disposed at a selected distance above or below the plurality of contact portions.

8. The disc drive of claim 6, wherein the tolerance ring comprises stainless steel.

9. The disc drive of claim 6, wherein the tolerance ring comprises polymeric material.

10. The disc drive of claim 6, wherein the tolerance ring comprises polyphenylsulfone.

* * * * *